United States Patent [19]

Smid et al.

[11] Patent Number: 4,861,982

[45] Date of Patent: Aug. 29, 1989

[54] SCANNING OPTICAL MICROSCOPE WITH POSITION DETECTION GRATING

[75] Inventors: Albert Smid; Antonius H. M. Akkermans; Jozef P. H. Benschop, all of Eindhoven; Cornelis J. P. M. Rooyackers, Waalre, all of Netherlands

[73] Assignee: U.S. Philips Corporation, New York, N.Y.

[21] Appl. No.: 219,516

[22] Filed: Jul. 15, 1988

[30] Foreign Application Priority Data

Jul. 21, 1987 [NL] Netherlands ............. 8701716

[51] Int. Cl.⁴ ............................................. H01J 3/14
[52] U.S. Cl. ............................... 250/235; 250/237 G
[58] Field of Search .................. 250/216, 237 G, 234, 250/235, 236; 350/107, 6.5, 6.6

[56] References Cited

U.S. PATENT DOCUMENTS 4,667,099 5/1987 Arai et al. ..................... 250/235
4,775,788 10/1988 Harshberger et al. ......... 250/237 G Primary Examiner—David C. Nelms

[57] ABSTRACT

A beam splitter (120) arranged in the radiation path of the scanning beam splits off a reference beam synchronously moving with the scanning spot (21) to a reference plane (140). The movement of the scanning spot (21) can be checked by measuring, with the aid of a radiation detector (160), the movement of a reference spot (121) formed by the reference beam in the reference plane. In this way an accurate determination of the position of the scanning spot (21) is possible while using simple beam-deflecting elements (40,42) having a relatively low accuracy. A cylindrical lens (131) gives the scanning spot the shape of a line, so that sensitivity to dust and other contaminations on the reference plane is reduced considerably.

8 Claims, 2 Drawing Sheets

SCANNING OPTICAL MICROSCOPE WITH POSITION DETECTION GRATING

BACKGROUND OF THE INVENTION

The invention relates to a scanning optical microscope comprising a radiation source unit for supplying a radiation beam and an objective system for focussing the radiation beam to a scanning spot in an object plane. At least one beam-deflecting element is arranged in the radiation path of the radiation beam for displacing the scanning spot in the object plane and a beam splitter is arranged in the radiation path of the radiation beam between the beam-deflecting element and the objective system for splitting off a reference beam from the radiation beam. A radiation-sensitive detection system in which a reference plane is present is arranged in the radiation path of the reference beam for detecting the position of a reference spot formed by the reference beam in the reference plane. A microscope of this type may be used for sampling a biological preparation or a piece of semiconductor material which has undergone one or more process steps for accommodating an integrated circuit therein.

A scanning optical microscope of the type described in the opening paragraph is known from the Article "High-precision laser scanning microscope" in IBM Technical Disclosure Bulletin, Vol. 28, no. 10, pages 4260–4261 (March 1986). In the microscope described in this Article the scanning spot is moved on the surface of an object by means of a rotatable mirror. A diffraction grating, with which two reference beams are separated from the scanning beam, is arranged in the radiation beam. Each reference beam is focussed in a reference plane in which a series of apertures is provided. Radiation from the reference beams, which passes the reference plane through the apertures, is used to generate a localisation signal for the scanning spot in the object plane.

In the known microscope the apertures in the reference plane and the size of the reference spot are very small. Dust and other contaminations on the reference plane therefore considerably affect the aperture radiation transmission and thus the accuracy with which the scanning spot position can be established.

SUMMARY OF THE INVENTION

The reference plane has a grating with grating lines extending in a direction substantially transverse to a direction of movement of the reference spot determined by the beam-deflecting element, and a cylindrical lens is arranged in the radiation path of the reference beam for deforming the reference spot to a reference line extending in a direction substantially transverse to the direction of movement. By choosing the length of the grating lines in the reference plane and the length of the reference line in such a way that they are much larger than the size of dust and other contaminations, only a small part of the apertures will be covered. Consequently, the intensity of the radiation through the apertures is only affected to a slight extent so that a clear position signal remains recognizable. It is to be noted that apertures are not only understood to mean transparent parts of the grating, but also, for example reflective parts which can establish a radiation path from the radiation source to a radiation-sensitive detection element. The radiation-sensitive detection system supplies a periodical clock pulse signal in which each period or pulse corresponds to a fixed distance in the object plane. The grating used may be either a transmission grating in which grating lines which are transparent and non-transparent to radiation alternate with one another, or a reflection grating composed of reflective and non-reflective grating lines.

For scanning a surface the microscope should be adapted to move the scanning spot in the object plane in two directions which are preferably mutually substantially perpendicular. The scanning rate in one direction may then be considerably slower than the scanning rate in the other direction. The reference branch may be used to check the movement in only one of the two directions. The faster scanning movement is preferably checked by means of the reference branch, whereas the slower scanning movement can be controlled by means of a controllable beam-deflecting element which, due to the low scanning frequency, can achieve the required accuracy is said direction in a relatively simple way. It is evident that the position of the spot in the second direction can also be checked by means of a second reference branch.

Where the microscope has two beam-deflecting elements for moving the scanning spot in two mutually substantially perpendicular directions in the object plane, the beam splitter is preferably arranged in the radiation path between the two beam-deflecting elements. It has been found in practice that by arranging the beam splitter and hence the reference branch directly behind the beam-deflecting element to be checked, the quality of the reference signal is enhanced so that the electronic processing of this signal does not require any measures for compensating a detrimental influence owing to a deviation in the alignment of the other beam-deflecting element.

The grating has a grating period which is from approximately one quarter of the width up to approximately the entire width of the reference spot in the direction of movement. The periodical clock signal supplied by the radiation-sensitive detection system then has a wavy variation so that the location can be very accurately determined by measuring characteristic points of the wave, such as the maximum values or the zero crossings, by means of known signal-processing techniques.

To indicate a fixed point on the grating, and hence on the image of the object, the grating is provided with a starting point indication which can be detected by means of the reference spot. Such a starting point indication produces a signal at the output of the radiation-sensitive detection system forming a reference point for the absolute position of the scanning spot in the object plane.

The starting point indication is a bounding line extending parallel to the grating lines between two areas in the reference plane, the optical properties of the areas being mutually different. The optical properties of the two areas may be different in that the one area is transparent or reflective to radiation whereas the other area absorbs radiation.

The two areas may be located next to the grating. Simultaneously with the grating the two areas are then covered by an auxiliary spot which is split off the reference beam, or by a part of the reference spot.

Preferably, one of the two areas is the grating and the other is an area whose reflection or transmission coefficient for the reference beam is substantially constant, said reflection or transmission coefficient being substantially equal to the average reflection or transmission coefficient of the grating. The starting point is then indicated by the transition between an area having a constant grey level and the grating itself. The area with the constant grey level, viewed in the direction of movement of the reference spot, may be located next to the grating as well as within the grating and it may adjoin parts of the grating on either side.

A constant grey level is understood to mean that the area has a substantially constant reflection or transmission for the reference spot. The area may, however, have a structure whose detail size is small with respect to the dimensions of the spot. The microscope according to the invention may therefore be further characterized in that the area with a substantially constant reflection or transmission coefficient is a grating having a grating constant which is smaller than one quarter of the size of the reference spot. Consequently the grating and the starting point indication can be provided on one and the same substrate by means of the same technique. The grating lines in the area having a substantially constant transmission may either be parallel to the grating lines of the grating itself, or they may be transverse thereto or they may extend at an angle thereto.

Figure 1:
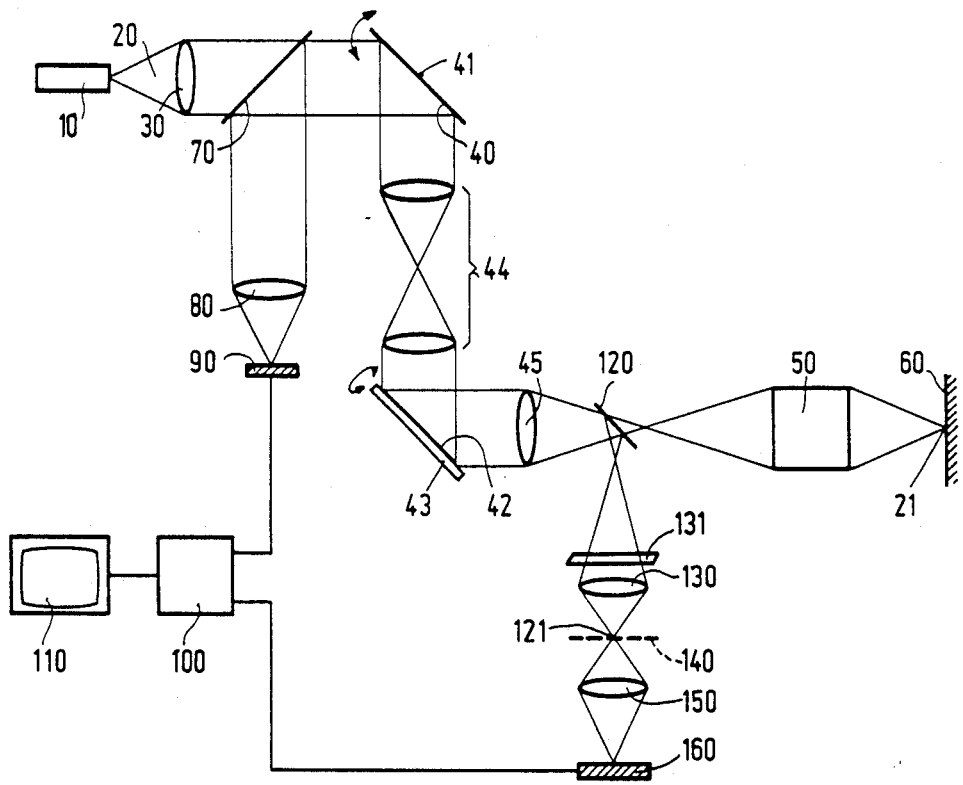
FIG. 1 shows diagrammatically a first embodiment of the scanning optical microscope according to the invention.

A radiation source 10, for example, a laser emits a radiation beam 20 which is focussed via a collimator system 30, a pair of beam-deflecting elements 40 an 42, and an objective system 50 to a scanning spot 21 on the surface 60. The two beam-deflecting elements are shown in the Figure as flat mirrors which are rotatable about an axis, but alternatively, the beam-deflecting elements may be, for example a rotatable polygon with reflective side faces or an electroacoustic element. In the Figure the axis of rotation 41 of mirror 40 is at right angles to the plane of the drawing and the axis of rotation 43 of the mirror 42 is located in the plane of the drawing.

It is to be noted that in contrast to the diagram shown in the Figure an orientation of the mirror 42 and the axis 43 will in practice be chosen in which the radiation path between the mirror 42 and the surface 60 will be directed substantially perpendicularly to the plane of the drawing. To avoid imaging errors and loss of light due to the finite distance between the two mirrors 40 and 42, they are imaged on each other by means of a lens system 44.

The radiation in the scanning spot 21 which is reflected from the surface 60 is received by the objective system 50 and coupled out to a lens system 80 by a beam splitter 70 via the mirrors 40 and 42. Via this lens system the radiation reaches a radiation detector 90 generating an electrical signal which may be used to form an image of the surface on an image display unit 110, for example a video monitor or a printing-device, by means of the image-processing system 100.

In the diagrammatic representation shown the beam splitter 70 is arranged between the collimator lens 30 and the mirror 40, but other positions, for example between the objective system 50 and the mirror 42 are alternatively possible, provided that the displacement of the radiation beam in the beam splitter due to scanning of the surface is taken into account.

In order that the image formed on the image display unit 110 is an accurate linear image of the surface 60, information about the position of the scanning spot 21 on the surface 60 must be available in the image-processing system 100. In the scanning optical microscope according to the invention this information originates from a reference plane 140 on which a sub-beam split off from the radiation beam 20 by a beam splitter 120 is focussed to a reference spot by means of a lens system 130. The information about the position may originate directly from the reference plane, for example, because a position-dependent radiation-sensitive detection system is arranged in this plane. A greater accuracy is, however, achieved by arranging a grating 140 with a constant grating period in the reference plane and by arranging a radiation-sensitive detection system 160 behind the grating. If the reference spot is displaced on the grating 140 the reference beam is modulated and thus a corresponding modulation is produced in the output signal of the detection system 160. One period in the output signal then corresponds to a fixed distance on the surface 60 of the object, provided that there are no distortions in the two branches whereby a linear image is disturbed.

In conformity with the invention, a cylindrical lens 131 is arranged in the radiation path of the reference beam. The cylindrical lens extends the scanning spot to an elongated spot whose longitudinal direction is parallel to the direction of the grating lines of the grating. The sensitivity of the reference system to dust and dirt on the grating is reduced thereby.

Figure 2:
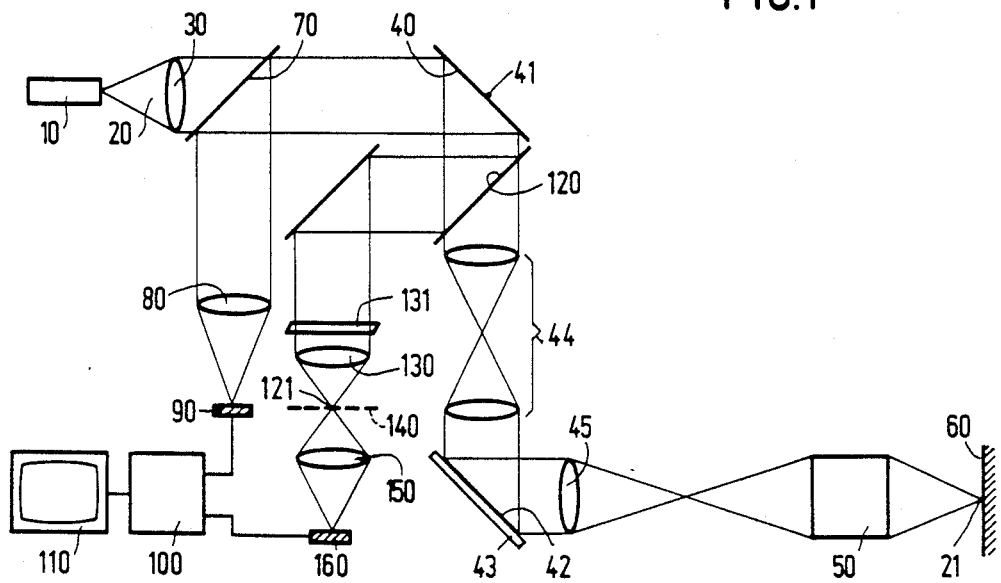
FIG. 2 shows diagrammatically a second embodiment and FIGS. 3, 4 and 5 show three embodiments of gratings which may be used for generating the clock pulses in the reference branch.

FIG. 2 shows a slightly different embodiment of the scanning optical microscope according to the invention. The comparable details in the drawing are denoted by the same reference numerals as in FIG. 1 and consequently they do not need any further explanation. In the embodiment according to FIG. 2 the beam splitter 120 is arranged in the radiation path between the two beam-deflecting elements 40 and 42. Consequently the clock signal, which is generated in the reference branch, is not subject to interferences and signal loss due to the beam-deflecting element 42.

Figure 3:
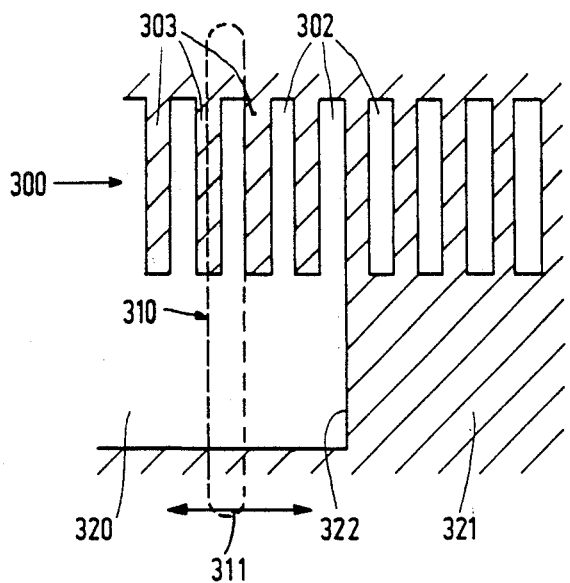
Figure 4:
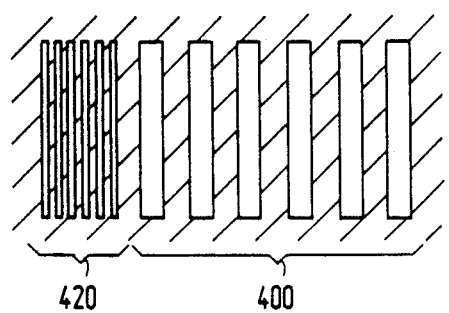
Figure 5:
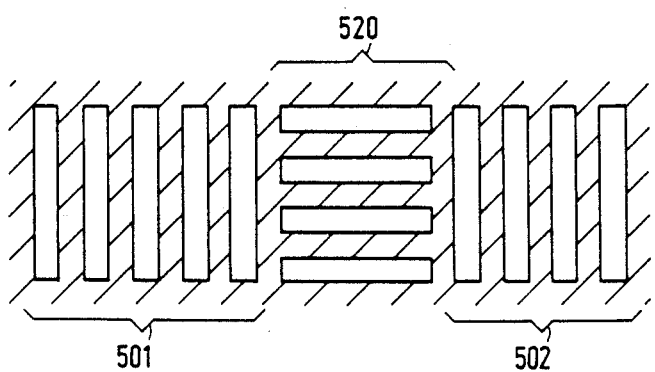

FIGS. 3, 4 and 5 show diagrammatically three embodiments of gratings which can be used in the reference plane. Each of these embodiments not only comprise the actual grating but also an area which serves to indicate a reference or starting point in the signal modulated by means of the grating.

In FIG. 3 the actual grating 300 comprises a plurality of juxtaposed light and dark strips 302 and 303, respectively. The dark strips 303 are, for example, radiation-absorbing and the light strips are radiation-transparent or radiation-reflective. The shape of a reference spot 310 formed on the grating is denoted by a broken line. When changing the adjustment of a beam-deflecting element, the spot 310 is displaced on the grating in the direction indicated by the arrow 311. The radiation from the reference beam passed or reflected by the grating is then periodically modulated in conformity with the displacement of the reference spot. The modulation and hence the displacement of the reference spot on the grating is detected by a radiation detector which is arranged in the radiation path of the modulated reference beam. The grating period is preferably between a quarter and half the width of the radiation spot so that a uniform wave-shaped modulation is brought about.

Two areas 320 and 321 are arranged next to the grating 300, which areas have mutually different optical properties and in which the bounding line 322 between these areas extend parallel to the direction of the grating lines. The optical properties of the areas are, for example, such that area 320 is comparable with the light strips 302 in the grating 300 and that area 321 is comparable with the dark strips 303.

When the reference beam simultaneously scans the grating 300 and the areas 320 and 321, for example, because the reference spot extends partly through these areas, a variation of the intensity level of the radiation incident on the radiation detector occurs at the transition between the areas 320 and 321. This intensity variation indicates a starting or reference point in the clock pulses from the radiation detector.

The grating shown in FIG. 3 requires two radiation detectors, one for detecting the clock pulse signal and one for detecting the bounding line 322 between the areas 320 and 321. Each of the two detectors should be provided with supply and read circuits and they should be aligned with respect to each other. FIG. 4 shows a grating with which the position of the starting point can be determined more accurately by means of one detector only. Here again the starting point is indicated by the bounding line between two areas having different optical properties, the bounding line being at right angles to the direction of movement of the reference spot. The one area denoted by 400 is the grating itself, the other area 420 is an adjoining grating area which is in alignment with the grating 400. This other area 420 has a transmission or reflection coefficient for radiation which is approximately equal to the average value of that of the grating 400.

Considerably different optical properties between the grating 400 and the adjoining area 420 have the drawback that the starting point must be determined by a variation of the average level of a periodically varying signal. The exact location of the starting point is then difficult to determine. In the grating according to FIG. 4 it is not the signal level but the modulation which changes at the transition of the reference spot from the area 420 to 400 so that an accurate detection of the starting point is possible.

In the embodiment of FIG. 4 this is realized by giving the area 420 the structure of a grating whose grating lines are parallel to the direction of the grating lines in the actual grating 400, but in which the grating period is considerably smaller than the width of the reference spot.

FIG. 5 shows another embodiment for providing a starting point in a grating. The grating period of the area 520 is approximately equal to the grating period of the actual grating. The direction of the grating lines is, however, parallel to the direction of displacement of the reference spot. In addition, in this embodiment the area 520 with optical properties different from the grating is arranged within the grating between two grating parts 501 and 502. Otherwise this grating is comparable with the grating shown in FIG. 4.

What is claimed is:

1. A scanning optical microscope comprising a radiation source unit for supplying a radiation beam, an objective system for focussing the radiation beam to a scanning spot in an object plane, at least one beam-deflecting element arranged in the radiation path of the radiation beam for displacing the scanning spot in the object plane, a beam splitter arranged in the radiation path of the radiation beam between the beam-deflecting element and the objective system for splitting off a reference beam from the radiation beam, and a radiation-sensitive detection system in which a reference plane is present which is arranged in the radiation path of the reference beam for detecting the position of a reference spot formed by the reference beam in the reference plane, characterized in that the reference plane has a grating with grating lines extending in a direction substantially transverse to a direction of movement of the reference spot determined by the beam-deflecting element and in that a cylindrical lens is arranged in the radiation path of the reference beam for deforming the reference spot to a reference line extending in a direction substantially transverse to the said direction of movement.

2. A microscope as claimed in claim 1, characterized in that the microscope comprises two beam-deflecting elements for moving the scanning spot in two mutually substantially perpendicular directions in the object plane, and in that the beam splitter is arranged in the radiation path between the two beam-deflecting elements.

3. A microscope as claimed in claim 1, characterized in that the grating has a grating period which is from approximately one quarter of the width up to approximately the entire width of the reference spot in the direction of movement.

4. A microscope as claimed in claim 1, characterized in that the grating is provided with a starting point indication which can be detected by means of the reference spot.

5. A microscope as claimed in claim 4, characterized in that the starting point indication is constituted by a bounding line extending parallel to the grating lines between two areas in the reference plane, the optical properties of said areas being mutually different.

6. A microscope as claimed in claim 5, characterized in that the two areas are located next to the grating.

7. A microscope as claimed in claim 5, characterized in that one of the two areas is the grating and the other is an area whose reflection or transmission coefficient for the reference beam is substantially constant, said reflection or transmission coefficient being substantially equal to the average reflection or transmission coefficient of the grating.

8. A microscope as claimed in claim 7, characterized in that the area with a substantially constant reflection or transmission coefficient is a grating having a grating constant which is smaller than one quarter of the size of the reference spot.

* * * * *